United States Patent
Chong et al.

(10) Patent No.: US 11,627,543 B2
(45) Date of Patent: *Apr. 11, 2023

(54) TERMINAL AND METHOD FOR PERFORMING CELL SEARCH IN WIRELESS COMMUNICATION SYSTEM

(71) Applicant: Samsung Electronics Co., Ltd., Suwon-si (KR)

(72) Inventors: Dahae Chong, Suwon-si (KR); Haechul Lee, Suwon-si (KR); Joohyun Do, Suwon-si (KR); Myungjoon Shim, Suwon-si (KR); Sungyoon Cho, Seoul (KR)

(73) Assignee: SAMSUNG ELECTRONICS CO, LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,432

(22) Filed: Sep. 3, 2021

(65) Prior Publication Data

US 2021/0400607 A1 Dec. 23, 2021

Related U.S. Application Data

(63) Continuation of application No. 16/679,741, filed on Nov. 11, 2019, now Pat. No. 11,115,946.

(30) Foreign Application Priority Data

Nov. 28, 2018 (KR) .................... 10-2018-0150085
Apr. 5, 2019 (KR) .................... 10-2019-0040295

(51) Int. Cl.
*H04W 56/00* (2009.01)
*H04L 5/00* (2006.01)
(Continued)

(52) U.S. Cl.
CPC .......... *H04W 56/001* (2013.01); *H04L 5/005* (2013.01); *H04W 72/005* (2013.01);
(Continued)

(58) Field of Classification Search
CPC . H04W 56/001; H04W 72/005; H04W 76/11; H04W 72/10; H04W 72/046; H04W 48/12; H04L 5/005; H04L 5/0048
See application file for complete search history.

(56) References Cited

U.S. PATENT DOCUMENTS

| | | | |
|---|---|---|---|
| 10,028,129 B2 | 7/2018 | Ly et al. | |
| 2012/0189085 A1* | 7/2012 | Shi | ...... H04L 27/2679 375/346 |

(Continued)

FOREIGN PATENT DOCUMENTS

| | | | |
|---|---|---|---|
| JP | 2006067471 A | | 3/2006 |
| KR | 10-2018-0091241 A | | 8/2018 |
| KR | 20200017711 A | * | 2/2020 |

OTHER PUBLICATIONS

3rd Generation Partnership Project; Technical Specification Group Radio Access Network; NR; Physical layer procedures for control, 3GPP TS 38.213 V15.3.0 (Sep. 2018). (Year: 2018).*

(Continued)

*Primary Examiner* — Shailendra Kumar
(74) *Attorney, Agent, or Firm* — Harness, Dickey & Pierce, P.L.C.

(57) ABSTRACT

An operating method of a terminal in a wireless communication system including a cell and the terminal includes receiving an external signal including a synchronization signal block (SSB) from the cell, the SSB including a primary synchronization signal (PSS), a secondary synchronization signal (SSS), and a physical broadcast channel (PBCH), obtaining a cell identification number of the cell using the PSS and the SSS, determining a plurality of
(Continued)

decoding priorities of a plurality of candidate indexes of the SSB, and performing decoding on the PBCH based on the plurality of decoding priorities.

20 Claims, 15 Drawing Sheets

(51) Int. Cl.
*H04W 72/00* (2009.01)
*H04W 72/04* (2009.01)
*H04W 72/10* (2009.01)
*H04W 76/11* (2018.01)
*H04W 72/044* (2023.01)

(52) U.S. Cl.
CPC ......... *H04W 72/046* (2013.01); *H04W 72/10* (2013.01); *H04W 76/11* (2018.02)

(56) References Cited

U.S. PATENT DOCUMENTS

| | | |
|---|---|---|
| 2018/0049082 A1* | 2/2018 | Kinthada Venkata ........................ H04W 36/0083 |
| 2018/0084593 A1 | 3/2018 | Chen et al. |
| 2018/0176065 A1 | 6/2018 | Deng et al. |
| 2018/0220360 A1 | 8/2018 | Sheng et al. |
| 2018/0227867 A1 | 8/2018 | Park et al. |
| 2018/0234931 A1 | 8/2018 | Ly et al. |
| 2020/0163037 A1* | 5/2020 | Zheng .................. H04L 5/0078 |

OTHER PUBLICATIONS

Notice of Allowance dated May 5, 2021, corresponding to U.S. Appl. No. 16/679,741.

* cited by examiner

| SSB | SSB index | RS |
|---|---|---|
| SSB0 | 000 | RS_0 |
| SSB1 | 001 | RS_1 |
| SSB2 | 010 | RS_2 |
| SSB3 | 011 | RS_3 |
| SSB4 | 100 | RS_4 |
| SSB5 | 101 | RS_5 |
| SSB6 | 110 | RS_6 |
| SSB7 | 111 | RS_7 |

| SSB_Cindex | S_seq |
|---|---|
| 000 | S_seq_0 |
| 001 | S_seq_1 |
| 010 | S_seq_2 |
| 011 | S_seq_3 |
| 100 | S_seq_4 |
| 101 | S_seq_5 |
| 110 | S_seq_6 |
| 111 | S_seq_7 |

FIG. 7B

| SSB_Cindex | Result_cor | |
|---|---|---|
| 000 | 1.1 | → 5th PR |
| 001 | 1.2 | → 4th PR |
| 010 | 1.4 | → 3rd PR |
| 011 | 1.7 | → 1st PR |
| 100 | 1.0 | → 6th PR |
| 101 | 0.9 | → 7th PR |
| 110 | 0.5 | → 8th PR |
| 111 | 1.5 | → 2nd PR |

TB3

TERMINAL AND METHOD FOR PERFORMING CELL SEARCH IN WIRELESS COMMUNICATION SYSTEM

CROSS-REFERENCE TO RELATED APPLICATIONS

The present application is a continuation of and claims priority under 35 U.S.C. § 120 to U.S. patent application Ser. No. 16/679,741, filed on Nov. 11, 2019, which claims the benefit of Korean Patent Application Nos. 10-2018-0150085 and 10-2019-0040295, respectively filed on Nov. 28, 2018 and Apr. 5, 2019, in the Korean Intellectual Property Office, the disclosures of which are incorporated herein in their entirety by reference.

BACKGROUND

The inventive concepts relate to a terminal an operating method for quickly performing cell search in a wireless communication system.

Recently, a fifth-generation wireless (5G) (or new radio (NR)) communication system has been developed and provides a high-speed data service of several Gbps by using an ultra-wide band compared to conventional long term evolution (LTE) or LTE-advanced (LTE-A) (e.g., having a bandwidth of 100 MHz or more). However, since it is difficult to secure an ultra-wide band frequency of 100 MHz or more in a frequency band of hundreds of MHz or several GHz (such as that applied to LTE or LTE-A), a 5G communication system that transmits a signal by using a wide frequency band corresponding to a frequency band of 6 GHz or more has been considered. In detail, in a 5G communication system, the data transmission rate may be increased using a millimeter wave band like a 28 GHz band or a 60 GHz band.

A 5G communication system that uses beamforming technology has been considered. The beamforming technology is used to generate a directional beam by using a plurality of antennas to increase a radio wave transmission range. The beamforming technology may be applied to a transmission device (for example, a cell or a base station) and a reception device (for example, a terminal). The beamforming technology increases a service area and decreases interference because a physical beam concentrates in a target direction.

Since the beamforming technology is applied to an operation of transmitting or receiving a signal for cell search in the 5G communication system, technology for enabling quick cell search for the 5G communication system would be desirable.

SUMMARY

The inventive concepts provide a terminal and an operating method thereof, which decrease an undesired operation in a cell search process (e.g., excessive decoding operations) performed by the terminal in a 5G communication system and, thus, quickly perform a cell search.

According to an aspect of the inventive concepts, there is provided an operating method of a terminal in a wireless communication system including a cell and the terminal, the operating method including receiving an external signal including a synchronization signal block (SSB) from the cell, the SSB including a primary synchronization signal (PSS), a secondary synchronization signal (SSS), and a physical broadcast channel (PBCH), obtaining a cell identification number of the cell using the PSS and the SSS, determining a plurality of decoding priorities of a plurality of candidate indexes of the SSB, and performing decoding on the PBCH based on the plurality of decoding priorities.

According to an aspect of the inventive concepts, there is provided an operating method of a terminal in a wireless communication system including a cell and the terminal, the operating method including receiving an external signal from the cell through one selected transmission beam selected from among a plurality of transmission beams, the external signal having a synchronization signal block (SSB) including a primary synchronization signal (PSS), a secondary synchronization signal (SSS), and a physical broadcast channel (PBCH), obtaining a cell identification number of the cell by using the PSS and the SSS, selecting a first candidate index among a first plurality of candidate indexes of the SSB as indicating the selected transmission beam based on a first amount of correlation between the external signal and a first internal signal of the terminal, and performing decoding on the PBCH using the first candidate index.

According to an aspect of the inventive concepts, there is provided a terminal for performing communication with a cell, the terminal including a plurality of antennas configured to form a plurality of reception beams for receiving an external signal from the cell through one selected transmission beam selected from among a plurality of transmission beams, the external signal having a synchronization signal block (SSB) including a primary synchronization signal (PSS), a secondary synchronization signal (SSS) and a physical broadcast channel (PBCH), and processing circuitry configured to, obtain a cell identification number of the cell by using the PSS and the SSS, determine a plurality of decoding priorities of a plurality of candidate indexes of the SSB, and perform decoding on the PBCH based on the plurality of decoding priorities.

BRIEF DESCRIPTION OF THE DRAWINGS

Embodiments of the inventive concepts will be more clearly understood from the following detailed description taken in conjunction with the accompanying drawings in which:

FIG. 2B is a table diagram for describing a reference signal set differently for each index of the SSB;

FIG. 7A is a table diagram for describing an operation of a reference signal sequence generating circuit of FIG. 6, and FIG. 7B is a table diagram for describing an operation of each of a correlation calculation circuit and a decoding priority determination circuit of FIG. 6;

DETAILED DESCRIPTION

A base station may be a main agent which communicates with a terminal and allocates a communication network resource to the terminal and may be at least one of a cell, a base station (BS), a NodeB (NB), an eNodeB (eNB), a next generation radio access network (NG RAN), a wireless access unit, a base station controller, and/or a node of a network. Hereinafter, for convenience of description, a base station may be referred to as a cell.

A terminal (or a communication terminal) may be a main agent which communicates with a cell or another terminal and may be referred to as a node, user equipment (UE), next generation UE (NG UE), a mobile station (MS), and/or mobile equipment (ME).

Moreover, a terminal may include at least one of a smartphone, a tablet personal computer (PC), a mobile phone, a video phone, an e-book reader, a desktop PC, a laptop PC, a netbook computer, a personal digital assistant (PDA), an MP3 player, a medical device, a camera, and/or a wearable device. Moreover, a terminal may be at least one of a television (TV), a digital video disk (DVD) player, an audio player, a refrigerator, an air conditioner, a vacuum cleaner, an oven, a microwave oven, a washer, a dryer, an air purifier, a set-top box, a home automation control panel, a security control panel, a media box (for example, Samsung HomeSync™, Apple TV™, and/or Google TV™), a gaming console (for example, Xbox™ and/or PlayStation™), an electronic dictionary, an electronic key, a camcorder, and/or an electronic picture frame. Moreover, a terminal may be at least one of various medical devices (for example, various portable medical measurement devices (for example, a blood sugar measurer, a heartbeat measurer, a blood pressure measurer, a body temperature measurer, etc.), a magnetic resonance angiography (MRA) device, a magnetic resonance imaging (MRI) device, a computed tomography (CT) device, an imaging device, and/or an ultrasonic device), a navigation device, a global navigation satellite system (GNSS), an event data recorder (EDR), a flight data recorder (FDR), an automotive infotainment device, a naval electronic device (for example, a naval navigation device, a gyro compass, etc.), an avionic electronic device, a security device, an automotive head unit, an industrial or consumer robot, a drone, an automated teller machine (ATM), a point of sales (POS), and/or an Internet of things (IoT) device (for example, a bulb, various sensors, a springcooler device, a fire alarm, a temperature controller, a street lamp post, a toaster, sporting equipment, a hot water tank, a heater, a boiler, etc.). In addition, a terminal may include various kinds of multimedia systems for performing a communication function.

Hereinafter, embodiments will be described in detail with reference to the accompanying drawings.

Figure 1:
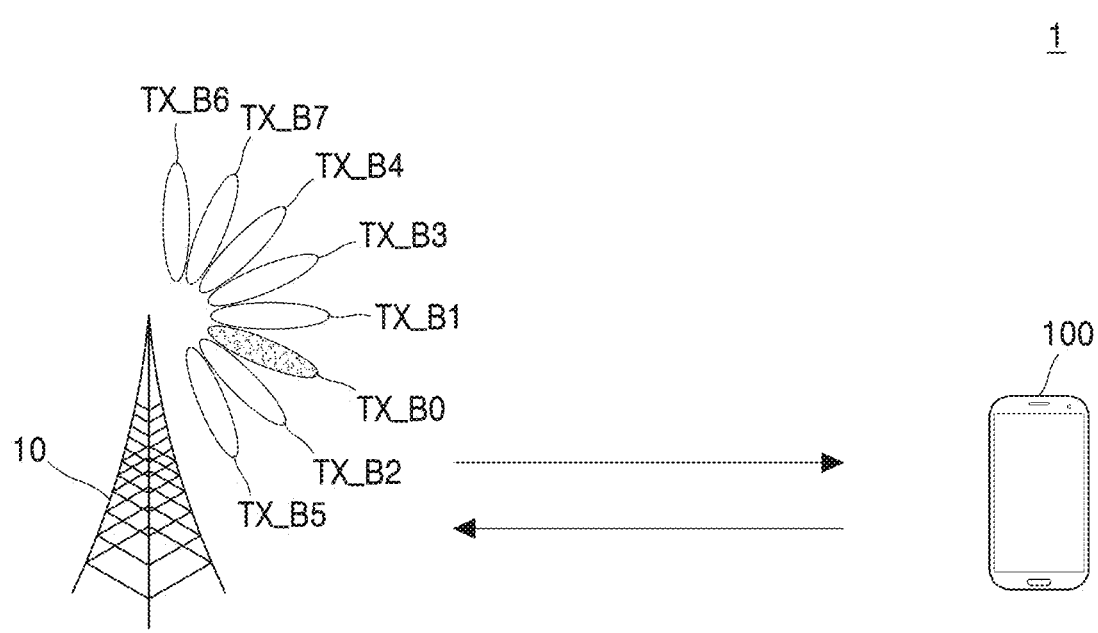
FIG. 1 is a block diagram illustrating a wireless communication system according to an example embodiment.
Figure 2A:
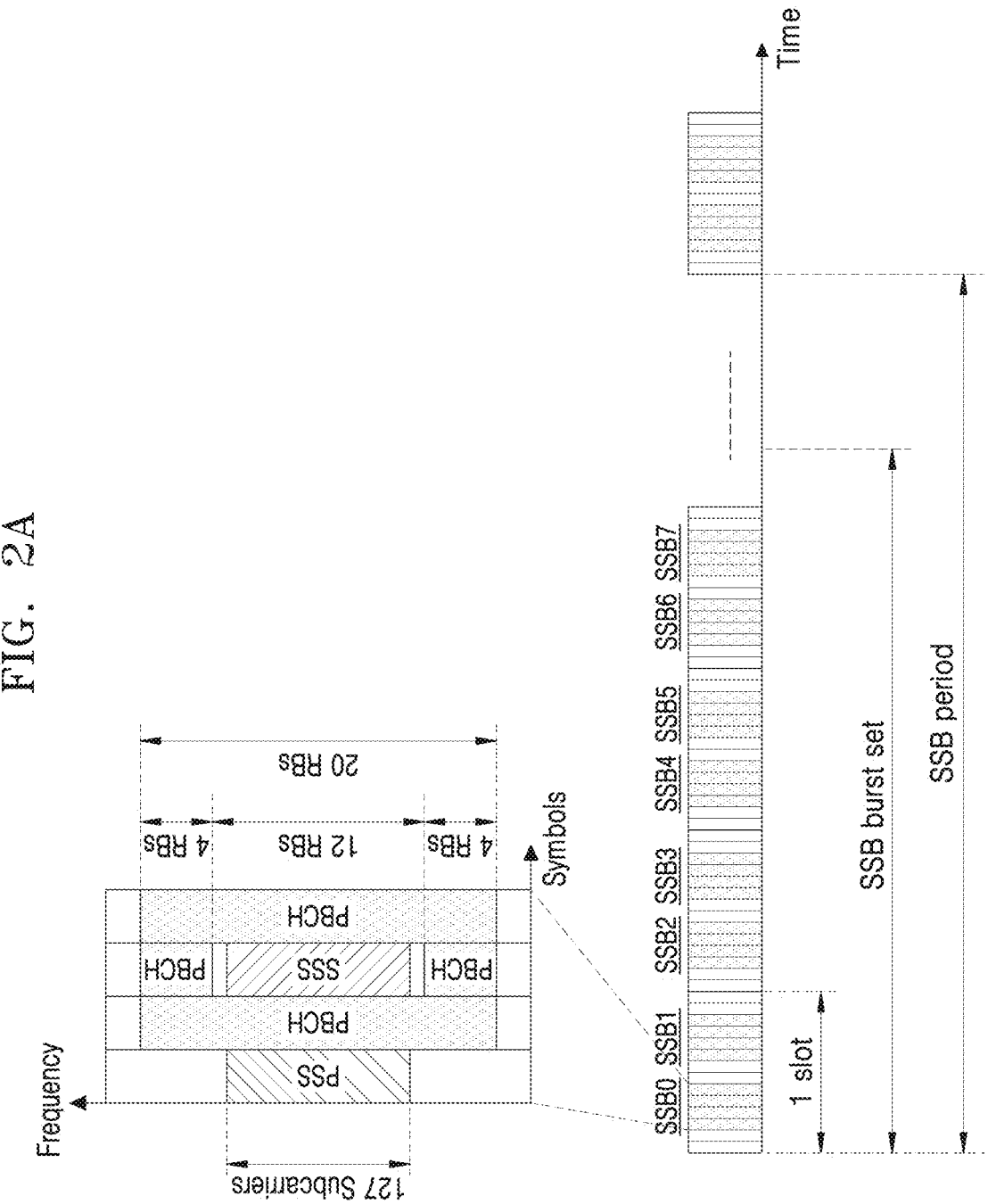
FIG. 2A is a diagram for describing a synchronization signal block (SSB) used for cell search.

FIG. 1 is a block diagram illustrating a wireless communication system 1 according to an example embodiment. FIG. 2A is a diagram for describing a synchronization signal block (SSB) used for cell search, and FIG. 2B is a table diagram for describing a reference signal set differently for each index of the SSB.

Referring to FIG. 1, the wireless communication system 1 may include a base station 10 (referred to as a cell 10 herein) and a terminal 100. For convenience of description, the wireless communication system 1 is illustrated as including one cell 10, but this is merely an example embodiment. Example embodiments are not limited thereto, and the wireless communication system 1 may include more cells. The cell 10 may be connected to the terminal 100 through a wireless channel and may provide various communication services to the terminal 100. The cell 10 may service all or some user traffic through a shared channel, and may collect and/or schedule state information such as a buffer state, an available transmission power state, a channel state, and/or the like of the terminal 100. The wireless communication system 1 may support beamforming technology by using orthogonal frequency division multiplexing (OFDM) as wireless access technology. Moreover, the wireless communication system 1 may support an adaptive modulation and coding (AMC) scheme in which a modulation scheme and a channel coding rate is determined on the basis of a channel state of the terminal 100.

The wireless communication system 1 may receive a signal by using (e.g., via) a wide frequency band corresponding to a frequency band of 6 GHz or more. For example, the wireless communication system 1 may increase a data transmission rate by using a millimeter wave band like a 28 GHz band or a 60 GHz band. In this case, the millimeter wave band may be relatively large in signal attenuation magnitude per distance, and thus, the wireless communication system 1 may support transmission and/or reception based on a directional beam, which is generated by using a multi-antenna so as to secure coverage. The wireless communication system 1 may perform a beam sweeping operation for transmission and/or reception based on the directional beam.

The beam sweeping operation may be an operation of sequentially or randomly sweeping, by using the terminal 100 and/or the cell 10, a directional beam having a certain pattern to determine a transmission beam and a reception beam which have directions synchronized with each other. That is, the pattern of the transmission beam and the reception beam which have directions synchronized with each other may be determined as a transceiving beam pattern pair. A beam pattern may be a shape of a beam determined as a width of the beam and a direction of the beam. Hereinafter, an embodiment where the terminal 100 performs a cell search will be mainly described assuming that the cell 10 transmits signals, which each include an SSB used for cell search, to the terminal 100 through a plurality of transmission beams (for example, first to eighth transmission beams) TX_B0 to TX_B7 (e.g., the first transmission beam TX_B0, the second transmission beam TX_B1, the third transmission beam TX_B2, the fourth transmission beam TX_B3, the fifth transmission beam TX_B4, the sixth transmission beam TX_B5, the seventh transmission beam TX_B6, and the eighth transmission beam TX_B7) having different beam patterns. However, FIG. 1 is merely an embodiment for convenience of understanding, and some example embodiments are not limited thereto. It may be sufficiently understood that there may various cases depending on a communication environment and/or situation.

Referring to FIGS. 1 and 2A, the cell 10 may transmit a signal, which includes one of first to eighth SSBs SSB0 to SSB7 (e.g., the first SSB SSB0, the second SSB SSB1, the third SSB SSB2, the fourth SSB SSB3, the fifth SSB SSB4, the sixth SSB SSB5, the seventh SSB SSB6, and the eighth SSB SSB7), to the terminal 100 through the plurality of transmission beams TX_B0 to TX_B7. For example, the cell 10 may transmit a signal including the first SSB SSB0 to the terminal 100 through the first transmission beam TX_B0 and may transmit a signal including the second SSB SSB1 to the terminal 100 through the second transmission beam TX_B1. In this manner, the cell 10 may transmit various SSBs SSB0 to SSB7 to the terminal 100 through the transmission beams TX_B0 to TX_B7, and the terminal 100 may search for the cell 10 by using one of the first to eighth SSBs SSB0 to SSB7. In FIG. 1, it may be assumed that the first transmission beam TX_B0 is selected in a beam sweeping process and the terminal 100 performs cell search using the first SSB SSB0.

As illustrated in FIG. 2A, an SSB may include a primary synchronization signal (PSS), a secondary synchronization signal (SSS), and/or a physical broadcast channel (PBCH). In an embodiment, an SSB may include four symbols, and a PSS, an SSS, and a PBCH may be located at positions corresponding to resource blocks (RBs) in a frequency axis direction. Moreover, one RB may include twelve subcarriers. For example, a PSS corresponding to a first symbol may be transmitted to the terminal 100 through 127 subcarriers.

In an embodiment, two SSBs may be provided in one slot of a signal, and the cell 10 may transmit an SSB burst set to the terminal 100 during an SSB period. For example, assuming that the wireless communication system 1 is an NR communication system to which subcarrier spacing of 15 KHz is applied, the cell 10 may transmit the SSB burst set including eight SSBs SSB0 to SSB7 to the terminal 100 during the SSB period. In this case, a length of one slot may be about 1 ms and the SSB period may be about 20 ms. However, this is merely an example embodiment, and some example embodiments are not limited thereto. The number of SSBs included in the SSB burst set, the SSB period, and/or a length of one slot may vary based on a size of subcarrier spacing, a synchronization signal period set in the cell 10, and/or a time section (e.g., period) allocated for cell search.

As described above, each of the SSBs SSB0 to SSB7 may be transmitted to the terminal 100 through a corresponding transmission beam of the transmission beams TX_B0 to TX_B7 of the cell 10, and each of the SSBs SSB0 to SSB7 may include an index indicating a corresponding transmission beam of the transmission beams TX_B0 to TX_B7. For example, in a case where the first SSB SSB0 is transmitted through the first transmission beam TX_B0, the first SSB SSB0 may include an index indicating the first transmission beam TX_B0 and the index may correspond to bit data (e.g., may be indicated by one or more data bits). The first to eighth SSBs SSB0 to SSB7 may have different indexes (or indices), and moreover, may include different reference signals. This will be described in detail with reference to FIG. 2B.

As shown in a table diagram TB1 of FIG. 2B, the first SSB SSB0 may be transmitted through the first transmission beam TX_B0 and may include an index '000', and a reference signal RS included in a PBCH of the first SSB SSB0 may be a first reference signal RS_0. The second SSB SSB1 may be transmitted through the second transmission beam TX_B1 and may include an index '001', and a reference signal RS included in a PBCH of the second SSB SSB1 may be a second reference signal RS_1. The third SSB SSB2 may be transmitted through the third transmission beam TX_B2 and may include an index '010', and a reference signal RS included in a PBCH of the third SSB SSB2 may be a third reference signal RS_2. The fourth SSB SSB3 may be transmitted through the fourth transmission beam TX_B3 and may include an index '011', and a reference signal RS included in a PBCH of the fourth SSB SSB3 may be a fourth reference signal RS_3. The fifth SSB SSB4 may be transmitted through the fifth transmission beam TX_B4 and may include an index '100', and a reference signal RS included in a PBCH of the fifth SSB SSB4 may be a fifth reference signal RS_4. The sixth SSB SSB5 may be transmitted through the sixth transmission beam TX_B5 and may include an index '101', and a reference signal RS included in a PBCH of the sixth SSB SSB5 may be a sixth reference signal RS_5. The seventh SSB SSB6 may be transmitted through the sixth transmission beam TX_B6 and may include an index '110', and a reference signal RS included in a PBCH of the seventh SSB SSB6 may be a seventh reference signal RS_6. The eighth SSB SSB7 may be transmitted through the eighth transmission beam TX_B7 and may include an index '111', and a reference signal RS included in a PBCH of the eighth SSB SSB7 may be an eighth reference signal RS_7.

Referring again to FIGS. 1 and 2A, the terminal 100 may receive a signal including the first SSB SSB0 through the first transmission beam TX_B0 selected through a beam sweeping operation and may perform a cell search by using the first SSB SSB0. In detail, the terminal 100 may detect a PSS of the first SSB SSB0 from a time domain, check timing (for example, a timing of about 5 ms) information about the cell 10 from the detected PSS, and check a location of an SSS of the first SSB SSB0 and a cell identification number (ID) of a cell ID group of the cell 10. Subsequently, the terminal 100 may detect an SSS from a frequency domain, check a frame timing of the cell 10 from the detected SSS, and check a cell group ID corresponding to the cell 10. However, since the terminal 100 has not determined an index of the first SSB SSB0, decoding of a PBCH of the first SSB SSB0 is performed by randomly using all candidate indexes expected to be included in the first SSB SSB0. A candidate index may denote an index capable of being included in an SSB, and referring to FIG. 2B for convenience of description, each of the SSBs SSB0 to SSB7 may include eight candidate indexes. In detail, since the terminal 100 has not determined that the first SSB SSB0 includes an index '000' before a decoding operation performed on a PBCH succeeds (e.g., is performed), the first SSB SSB0 may perform the decoding operation on the PBCH on the basis that the first SSB SSB0 is capable of including one index of candidate indexes '000' to '111'. Therefore, PBCH decoding may be performed a plurality of times equal or similar to the number of candidate indexes of the first SSB SSB0 depending on the case, and in this case, cell search may be considerably delayed, causing the reduction in communication performance of the terminal 100.

In order to improve over the above-described disadvantages, the terminal 100 according to an example embodiment may determine decoding priorities of candidate indexes of a received SSB and may perform decoding on a PBCH included in the SSB on the basis of the determined decoding priorities to perform a fast cell search operation. That is, the terminal 100 may determine decoding priorities of candidate indexes of the first SSB SSB0 so that decoding of a PBCH is performed by using a candidate index estimated as a real index (e.g., an index indicating the first transmission beam TX_B0 for transmitting the first SSB SSB0) of the first SSB SSB0 among candidate indexes of the first SSB SSB0.

The terminal 100 according to an example embodiment may generate information representing correlation degrees (e.g., a plurality of correlation values representing an amount of correlation) between reference signal sequences respectively corresponding to candidate indexes of an SSB and a reference signal included in the SSB and may determine decoding priorities of the candidate indexes of the SSB on the basis of the information.

The terminal 100 according to an example embodiment may decrease an undesired decoding operation by using a candidate index estimated as a real index of an SSB in performing decoding on a PBCH, and thus, a cell search may be performed efficiently and quickly. Furthermore, the terminal 100 may quickly complete a cell search through a cell search operation based on decoding priorities in a 5G communication environment which is quickly changed, and thus, stability of communication may be ensured or improved.

Figure 3:
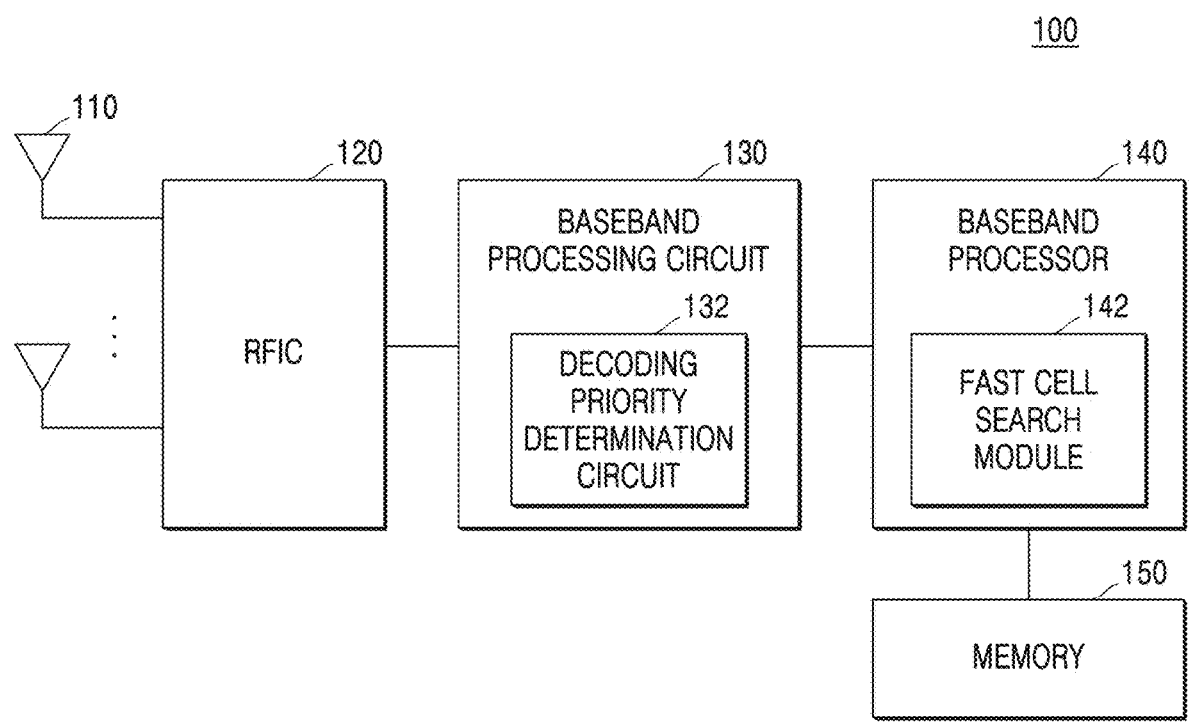
FIG. 3 is a block diagram illustrating a terminal according to an example embodiment.

FIG. 3 is a block diagram illustrating a terminal 100 according to an example embodiment.

Referring to FIG. 3, the terminal 100 may include a plurality of antennas 110, a radio frequency (RF) integrated circuit 120, a baseband processing circuit 130, a baseband processor 140, and/or a memory 150. The terminal 100 of FIG. 3 is merely an example embodiment, but some example embodiments are not limited thereto. In some example embodiments, the baseband processing circuit 130 may be included in the RF integrated circuit 120 or the baseband processor 140.

The antennas 110 may transmit a signal (e.g., a signal processed by the RF integrated circuit 120) through a wireless channel, and/or may receive a signal transmitted through the wireless channel from a cell. The antennas 110 may support beamforming and may each be implemented as an array antenna, a patch antenna, and/or the like. Particularly, the antennas 110 may form a plurality of reception beams so as to receive a signal transmitted through transmission beams having various patterns from the cell, thereby supporting beam sweeping.

The RF integrated circuit 120 may low-noise-amplify a signal received through the antennas 110 and may perform frequency down-conversion on the amplified signal to generate a baseband signal. The baseband processing circuit 130 may perform a conversion function between the baseband signal and a bitstream (e.g., to convert the baseband signal to a bitstream) on the basis of a physical layer specification. For example, the baseband processing circuit 130 may demodulate and decode the baseband signal provided from the RF integrated circuit 120 to restore (e.g., generate) a received bitstream.

The baseband processing circuit 130 according to an example embodiment may include a decoding priority determination circuit 132. The decoding priority determination circuit 132 may generate information representing correlation degrees (e.g., degrees of correlation) between a reference signal included in an SSB (e.g., an SSB included in a received transmission beam from the cell) and a reference signal sequences respectively corresponding to candidate indexes of the SSB. The decoding priority determination circuit 132 may reflect an estimation value of a channel between the terminal 100 and the cell in a process of generating the information, and/or may consider a phase offset which occurs when receiving a signal including the SSB (e.g., a factor associated with communication).

The decoding priority determination circuit 132 may sort (e.g., order or rank) candidate indexes in descending power of correlation degrees between the reference signal sequences and the reference signal included in the SSB on the basis of the generated information to determine decoding priorities. Moreover, the decoding priority determination circuit 132 may filter at least one candidate index, which is not used in a decoding operation, of the candidate indexes of the SSB on the basis of the generated information and may determine decoding priorities of target candidate indexes applied to the decoding operation.

The baseband processor 140 may control various operations of the terminal 100 which are relevant to wireless communication with the cell. The baseband processor 140 may include a fast cell search module 142 for performing a selective cell search operation on the basis of decoding priorities of candidate indexes according to an example embodiment. The fast cell search module 142 may perform decoding on a PBCH of the SSB on the basis of the decoding priorities generated by the decoding priority determination circuit 132. Furthermore, the fast cell search module 142 may control a series of operations of determining, by using the decoding priority determination circuit 132, the decoding priorities.

The fast cell search module 142 may select an $N^{th}$ candidate index corresponding to a first priority with reference to the decoding priorities, estimate a channel between the terminal 100 and the cell by using a reference signal sequence corresponding to the $N^{th}$ candidate index, and perform a decoding operation on the PBCH by using a channel estimation result. According to some example embodiments, the channel estimation and decoding operation would be performed in a manner known to a person having ordinary skill in the art. When the decoding operation performed on the PBCH succeeds by using the $N^{th}$ candidate index, the terminal 100 may regard the $N^{th}$ candidate index as a real index of the SSB (e.g., the terminal 100 may determine the $N^{th}$ candidate index to be the correct index of the SSB) and may report the $N^{th}$ candidate index to the cell. The cell may transmit signals for a wireless communication operations to the terminal 100 through a transmission beam corresponding to the $N^{th}$ candidate index reported from the terminal 100. When the decoding operation performed on the PBCH fails by using the $N^{th}$ candidate index, the fast cell search module 142 may select an $N+1^{th}$ candidate index corresponding to a second priority with reference to the decoding priorities, estimate a channel between the terminal 100 and the cell by using a reference signal sequence corresponding to the $N+1^{th}$ candidate index, and perform a decoding operation on the PBCH by using a channel estimation result. In this manner, the fast cell search module 142 may perform decoding on the PBCH by sequentially using the candidate indexes on the basis of the decoding priorities until decoding performed on the PBCH succeeds.

According to some example embodiments, operations described herein as being performed by the terminal 100, the RFIC 120, the baseband processing circuit 130, the decoding priority determination circuit 132 and/or the fast cell search module 142 may be performed by processing circuitry (e.g., the baseband processor 140). The term 'processing circuitry,' as used in the present disclosure, may refer to, for example, hardware including logic circuits; a hardware/ software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the fast cell search module 142 may be implemented as a hardware logic provided in the baseband processor 140.

Moreover, the fast cell search module 142 may be implemented as a software logic which is stored as a plurality of instruction codes in the memory 150 and is executed by the baseband processor 140.

The memory 150 may store data such as a basic program, an application program, and/or setting information for an operation of the terminal 100 and may provide the stored data in response to a request of the baseband processor 140. The memory 150 may store various pieces of data generated by the decoding priority determination circuit 132. For example, the memory 150 may store information representing correlation degrees between the reference signal included in the SSB and the reference signal sequences respectively corresponding to the candidate indexes of the SSB or information representing the decoding priorities of the candidate indexes of the SSB.

The memory 150 may include, for example, an internal memory and/or an external memory. The internal memory may include, for example, at least one of a volatile memory (for example, dynamic random access memory (DRAM), and/or synchronous dynamic random access memory (SDRAM)) or a non-volatile memory (for example, one time programmable read only memory (OTPROM), programmable read only memory (PROM), erasable programmable read only memory (EPROM), electrical erasable programmable read only memory (EEPROM), mask read only memory (ROM), flash read only memory (ROM), flash memory, hard drive, and/or solid state drive (SSD)). The external memory may include flash drive (for example, compact flash (CF), secure digital (SD), micro-SD, mini-SD, extreme digital (xD), multi-media card (MMC), and/or memory stick). The external memory may be functionally and/or physically connected to the terminal 100 through various interfaces.

Figure 4:
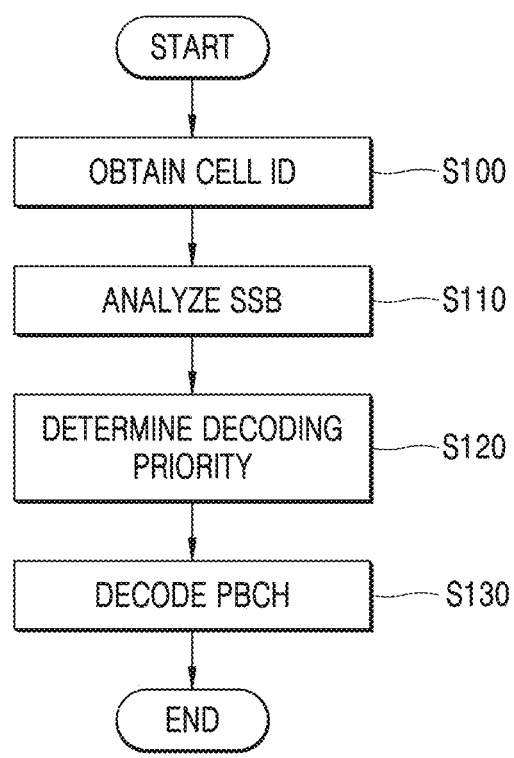
FIG. 4 is a flowchart of an operating method of a terminal according to an example embodiment.

FIG. 4 is a flowchart of an operating method of a terminal according to an example embodiment.

Referring to FIG. 4, a terminal may receive a signal including an SSB through a transmission beam formed by a cell and may obtain an identifier (ID) of the cell by using a PSS and an SSS of the SSB in operation S100. In operation S110, the terminal may analyze the SSB for performing a fast cell search operation. In order to analyze the SSB, the terminal may generate an internal signal corresponding to the SSB, compare the internal signal with the received SSB, and previously plan a process of decoding a PBCH of the SSB (e.g., by determining decoding priorities). In detail, the terminal may generate information representing correlation degrees between reference signal sequences respectively corresponding to candidate indexes of an SSB and a reference signal included in the SSB. In operation S120, the terminal may determine decoding priorities of the candidate indexes of the SSB, which is the basis of the fast cell search operation. In detail, the terminal may sort the candidate indexes in descending power of correlation degrees between the reference signal sequences and the reference signal included in the SSB to determine the decoding priorities, based on the information generated in operation S110.

Subsequently, in operation S130, the terminal may perform decoding on the PBCH of the SSB on the basis of the decoding priorities.

Figure 5:
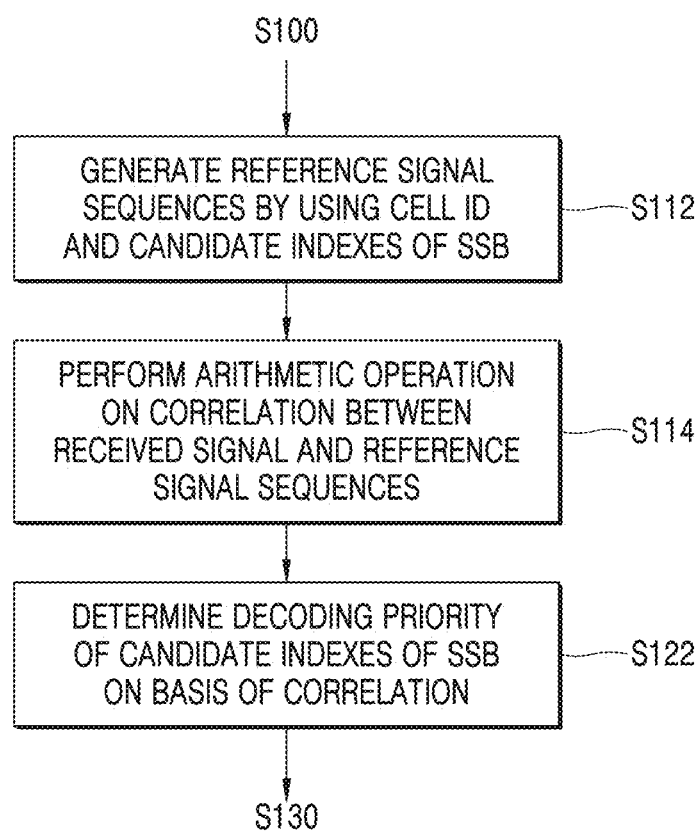
FIG. 5 is a flowchart of an operating method of a terminal in operation S110 and operation S120 of FIG. 4 in detail, according to an example embodiment.

FIG. 5 is a flowchart of an operating method of a terminal in operation S110 and operation S120 of FIG. 4 in detail, according to an example embodiment.

Referring to FIG. 5, in operation S112, the terminal may generate the reference signal sequences (e.g., the reference signal sequences respectively corresponding to candidate indexes of an SSB and a reference signal included in the SSB) by using the cell ID obtained in operation S100 and the candidate indexes of the SSB received in operation S100. That is, since the reference signals included in the SSB differ based on an index of the SSB, the terminal may generate different reference signal sequences on the basis of the candidate indexes of the SSB.

In operation S114, the terminal may calculate correlation degrees (e.g., degrees of correlation) between a received signal and the reference signal sequences (e.g., by performing an arithmetic operation). In an embodiment, the terminal may perform a fast Fourier transform (FFT) on the received signal received from the cell to extract the SSB from an FFT-performed received signal. The terminal may calculate correlation degrees between the reference signal sequences and the reference signal included in the extracted SSB. In an embodiment, the terminal may descramble a reference signal sequence and the reference signal of the SSB for each location to generate a plurality of energy values and may combine the plurality of energy values to generate a correlation degree between the reference signal sequence and the reference signal of the SSB. Descrambling may denote an operation of generating a value representing an energy correlation degree between the reference signal sequence and the reference signal of the SSB. That is, the terminal may check a degree to which the reference signal of the SSB matches the reference signal sequence, based on descrambling.

In operation S122, the terminal may determine decoding priorities of the candidate indexes of the SSB on the basis of the correlation degrees between the reference signal included in the SSB and the reference signal sequences. As described above, the terminal may determine the decoding priorities of the candidate indexes of the SSB in descending power of the correlation degrees. Furthermore, the terminal may exclude (e.g., remove) a candidate index, which has a correlation degree equal to or less than a reference value, of the SSB from a decoding operation performed on the PBCH. According to some example embodiments, operations 112 and 114 may be performed as part of operation S110, and operation 122 may be performed as part of operation S120, of FIG. 4.

Figure 6:
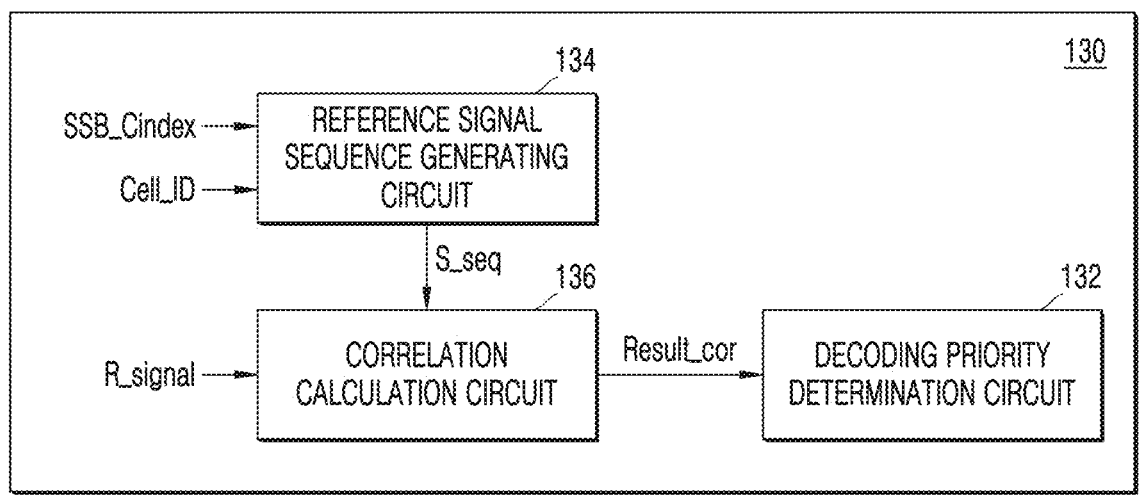
FIG. 6 is a block diagram illustrating a baseband processing circuit according to an embodiment.

FIG. 6 is a block diagram illustrating a baseband processing circuit 130 according to an embodiment. FIG. 7A is a table diagram for describing an operation of a reference signal sequence generating circuit 134 of FIG. 6, and FIG. 7B is a table diagram for describing an operation of each of a correlation calculation circuit 136 and a decoding priority determination circuit 132 of FIG. 6.

Referring to FIG. 6, the baseband processing circuit 130 may include the decoding priority determination circuit 132, a reference signal sequence generating circuit 134, and/or a correlation calculation circuit 136. The reference signal sequence generating circuit 134 may receive a candidate index SSB_Cindex and a cell ID Cell_ID of an SSB and may generate a reference signal sequence S_seq by using the candidate index SSB_Cindex (as discussed herein, the candidate index SSB_Cindex may refer to a single candidate index or a plurality of candidate indexes) and the cell ID Cell_ID. Referring further to a second table TB2 of FIG. 7A in order to help understanding, the candidate index SSB_Cindex of the SSB may correspond to one of '000' to '111', and when the total number of candidate indexes SSB_Cindex of the SSB is eight, the reference signal sequence generating circuit 134 may generate eight reference signal sequences S_seq_0 to S_seq_7 (e.g., the first reference signal sequence S_seq_0, the second reference signal sequence S_seq_1, the third reference signal sequence S_seq_2, the fourth reference signal sequence S_seq_3, the fifth reference signal sequence S_seq_4, the sixth reference signal sequence S_seq_5, the seventh reference signal sequence S_seq_6, and the eighth reference signal sequence S_seq_7). According to some example embodiments, the second table TB2 of FIG. 7A, or another table associating candidate indexes to a cell ID and corresponding reference signal sequences may be stored in a memory (e.g., the memory 150), and may be accessed by the reference signal sequence generating circuit 134 in order to generate reference signal sequences based on the candidate indexes and the cell ID (e.g., the candidate index SSB_Cindex and the cell ID Cell_ID). The reference signal sequence generating circuit 134 may receive the candidate index SSB_Cindex and the cell ID Cell_ID of the SSB from the baseband processor 140, and/or may receive the candidate index SSB_Cindex and the cell ID Cell_ID each generated by the baseband processing circuit 130.

Referring again to FIG. 6, the correlation calculation circuit 136 may perform an arithmetic operation on a correlation degree (e.g., may perform an arithmetic operation to determine a degree or amount of correlation) between a reference signal sequence S_seq and a reference signal R_signal extracted from an SSB included in a received signal, to output a calculation result Result_cor to the decoding priority determination circuit 132. Referring further to a third table TB3 of FIG. 7B in order to help understanding, the correlation calculation circuit 136 may calculate correlation degrees between eight reference signal sequences S_seq_0 to S_seq_7 and a reference signal R_signal to generate eight calculation results Result_cor associated with candidate indexes SSB_Cindex corresponding to the eight reference signal sequences S_seq_0 to S_seq_7. In FIG. 6, it is illustrated that the calculation result Result_cor generated by the correlation calculation circuit 136 is directly provided to the decoding priority determination circuit 132, but this is merely an example embodiment and some example embodiments are not limited thereto. In some example embodiments, the calculation result Result_cor may be stored as data in a memory, and the decoding priority determination circuit 132 may access the memory to determine a decoding priority with reference to the calculation result Result_cor (as discussed herein, the calculation result Result_cor may refer to a calculation result or a plurality of calculation results). According to some example embodiments, operations described herein as being performed by the reference signal sequence generating circuit 134 and/or the correlation calculation circuit 136 may be performed by processing circuitry.

Referring again to FIG. 6, the decoding priority determination circuit 132 may sort candidate indexes in the order of candidate indexes corresponding to the reference signal sequence S_seq having a high correlation degree with the reference signal R_signal on the basis of the calculation result Result_cor to determine a decoding priority. Referring further to the third table TB3 of FIG. 7B in order to help understanding, the decoding priority determination circuit 132 may determine decoding priorities PR in the order of a candidate index '011', a candidate index '111', a candidate index '010', a candidate index '001', a candidate index '000', a candidate index '100', a candidate index '101', and a candidate index '110' on the basis of the calculation result Result_cor. That is, the decoding priority determination circuit 132 may determine the decoding priorities PR so that a candidate index corresponding to the reference signal sequence S_seq having a highest or a high correlation degree with the reference signal R_signal is prioritized in PBCH decoding. For example, in performing decoding on the PBCH, candidate indexes may be used in the order of the candidate index '011', the candidate index '111', the candidate index '010', the candidate index '001', the candidate index '000', the candidate index '100', the candidate index '101', and the candidate index '110' on the basis of the decoding priorities PR.

Figure 8A:
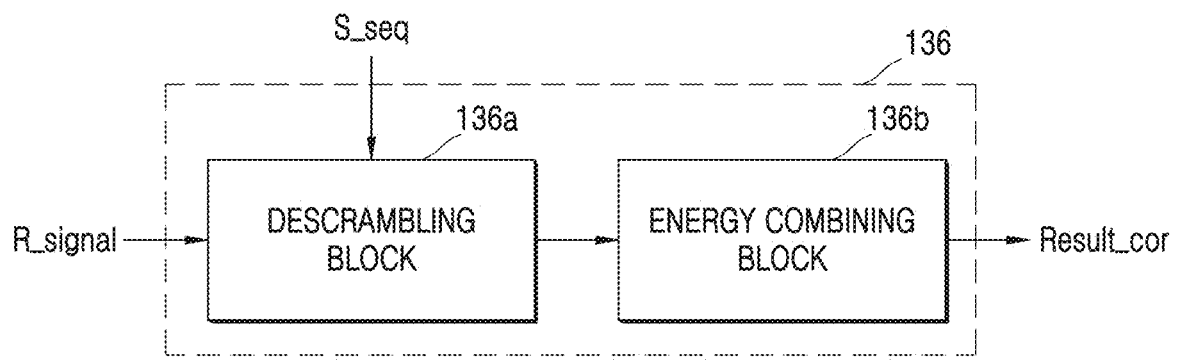
FIGS. 8A and 8B are block diagrams illustrating a correlation calculation circuit according to an example embodiment.
Figure 8B:
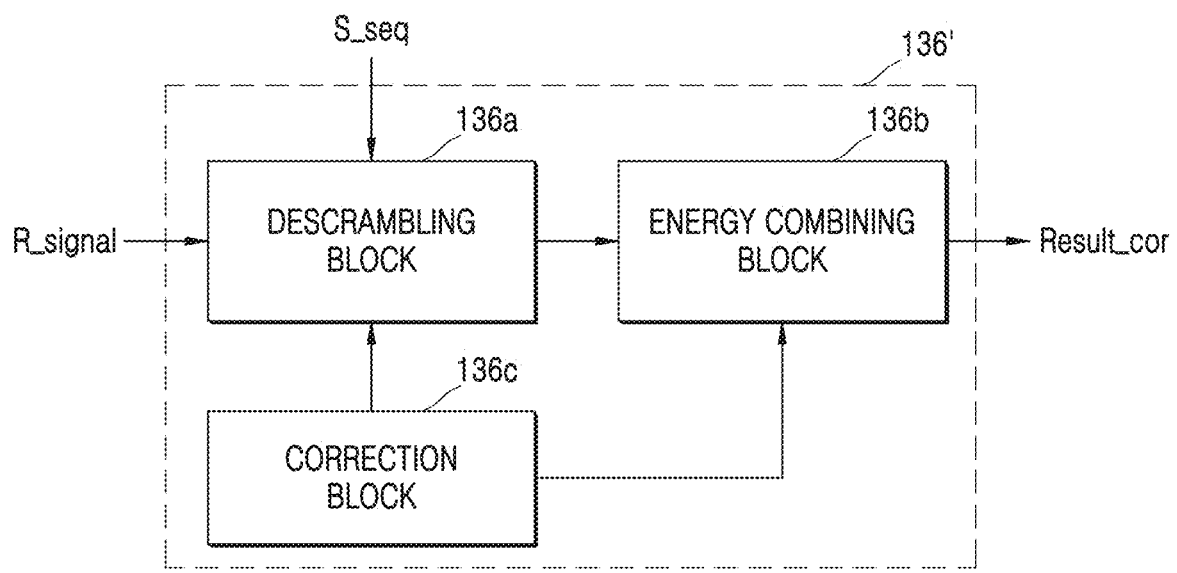

FIGS. 8A and 8B are block diagrams illustrating correlation calculation circuits 136 and 136' according to an example embodiment.

Referring to FIG. 8A, the correlation calculation circuit 136 may include a descrambling block 136a and/or an energy combining block 136b. The descrambling block 136a may receive a reference signal R_signal and a reference signal sequence S_seq corresponding to one candidate index and may perform a descrambling operation using the reference signal R_signal and the reference signal sequence S_seq. The descrambling block 136a may perform a calculation operation representing an energy correlation degree between the reference signal R_signal and the reference signal sequence S_seq. Since the reference signal R_signal is in a certain frequency range, the descrambling block 136a may descramble the reference signal R_signal and the reference signal sequence S_seq for each frequency location to generate a plurality of energy values (e.g., energy values for each frequency location for each of the reference signal R_signal and the reference signal sequence S_seq). According to some example embodiments, the reference signal sequence S_seq is stored in descrambled form corresponding to a plurality of energy values. The energy combining block 136b may combine the plurality of energy values generated by the descrambling block 136a to generate a calculation result Result_cor corresponding to one candidate index. According to some example embodiments, the plurality of energy values of each reference signal sequence S_seq may be combined with (e.g., summed with, subtracted from, and/or correlated with) those of the reference signal R_signal (e.g., at the frequency locations of the reference signal R_signal and/or within the certain frequency range of the reference signal R_signal) to generate the calculation result Result_cor for each candidate index.

However, a configuration of the correlation calculation circuit 136 is merely an example embodiment, but some example embodiments are not limited thereto. In some example embodiments, the correlation calculation circuit 136 may perform various arithmetic operations for quantitatively checking a correlation degree (e.g., a degree to which the reference signal R_signal matches the reference signal sequence S_seq) between the reference signal R_signal and the reference signal sequence S_seq. According to some example embodiments, operations described herein as being performed by the descrambling block 136a and/or the energy combining block 136b may be performed by processing circuitry.

Referring to FIG. 8B, the correlation calculation circuit 136' may further include a correction block 136c compared to the correlation calculation circuit 136 of FIG. 8A. Hereinafter, an operation of the correction block 136*c* will be mainly described. The correction block 136*c* may control a descrambling block 136*a* to perform a descrambling operation, based on a current communication environment between a cell and a terminal.

In an embodiment, the correction block 136*c* may correct a reference signal R_signal by using an estimation value of a channel between the terminal and the cell and/or may control the descrambling block 136*a* to perform the descrambling operation. In this case, the correction block 136*c* may estimate the channel between the terminal and the cell and may provide the estimation value of the channel to the descrambling block 136*a*.

In an embodiment, the correction block 136*c* may control the descrambling block 136*a* to generate a plurality of energy values corrected through interpolation using a plurality of frequency location-based energy values generated by the descrambling block 136*a*, based on a phase offset occurring when the terminal receives a signal including an SSB from the cell.

In an embodiment, the correction block 136*c* may control an energy combining block 136*b* so that weight values set based on a communication environment with respect to a plurality of energy values (e.g., a factor associated with communication) are reflected in combining the plurality of energy values generated by the descrambling block 136*a*. For example, the correction block 136*c* may control the energy combining block 136*b* to multiply a first energy value by a first weight value and multiply a second energy value by a second weight value to correct each energy value, and to combine the first energy value and the second energy value based on the communication environment. Weight value information based on the communication environment may be stored in the form of a lookup table in the correction block 136*c*, or the correction block 136*c* may flexibly (e.g., dynamically) generate the weight value information on the basis of the communication environment.

Figure 9:
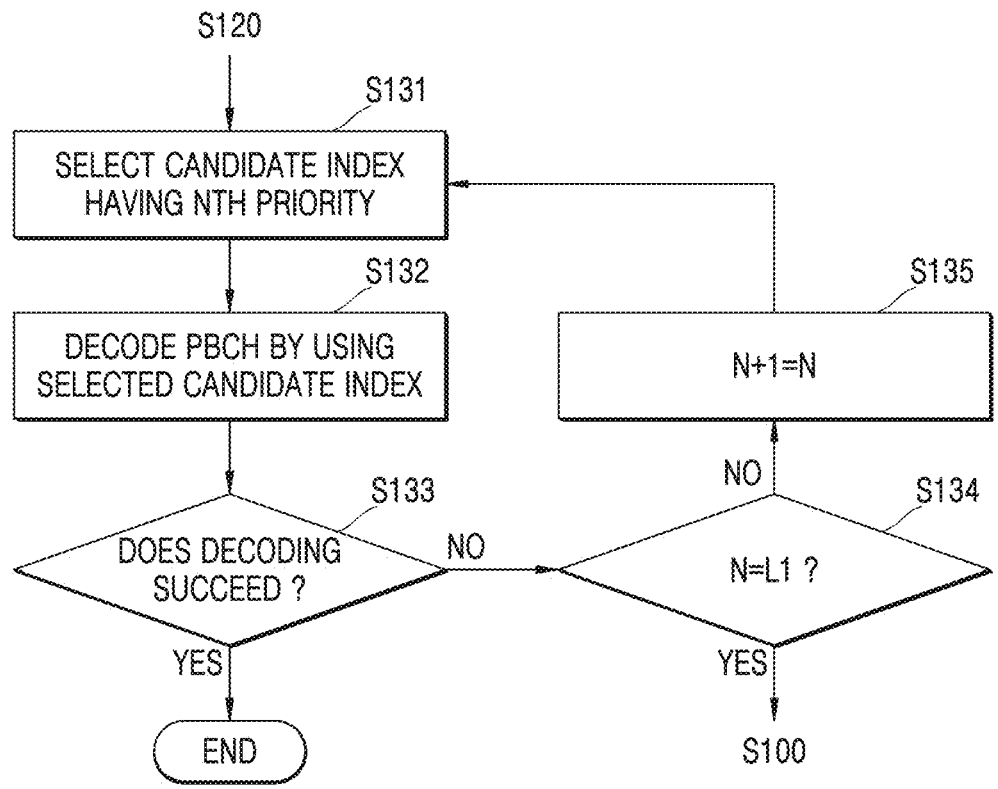
FIG. 9 is a flowchart of an operating method of a terminal in operation S130 of FIG. 4 in detail, according to an example embodiment.

FIG. 9 is a flowchart of an operating method of a terminal in operation S130 of FIG. 4 in detail, according to an example embodiment.

Referring to FIG. 9, in operation S131, a terminal may select a candidate index having an $N^{th}$ priority (e.g., the highest priority) with reference to decoding priorities of candidate indexes of a received SSB. In operation S132, the terminal may decode a PBCH by using the selected candidate index. In detail, the terminal may estimate a channel between the cell and the terminal by using a reference signal sequence corresponding to the selected candidate index and a reference signal of the received SSB and may perform decoding on the PBCH by using a channel estimation result. According to some example embodiments, the channel estimation and decoding would be performed in a manner known to a person having ordinary skill in the art. In operation S133, the terminal may determine the decoding succeeds or fails on the basis of a certain scheme (for example, a cyclic redundancy code (CRC) check scheme). When the decoding succeeds (S133, Yes), the terminal may report the selected candidate index to the cell and may end (e.g., successfully complete) a cell search operation. Otherwise, when the decoding fails (S133, No), the terminal may determine whether 'N' corresponds to 'L1' representing the number of candidate indexes of the SSB in operation S134. When 'N' does not correspond to 'L1' (S134, No) (e.g., when N is not the last candidate index in priority order), the terminal may increment 'N' in operation S135 and may proceed to operation S131. That is, the terminal may select a candidate index having an $N+1^{th}$ priority (the next highest priority) and may perform subsequent operations. Otherwise, when 'N' corresponds to 'L1' (S134, Yes), the terminal may check (e.g., determine) that a PBCH decoding operation based on a decoding priority fails and may receive a new SSB from the cell to proceed to operation S100 of FIG. 4, or may proceed to operation S100 of FIG. 4 by using another previously received SSB.

Figure 10:
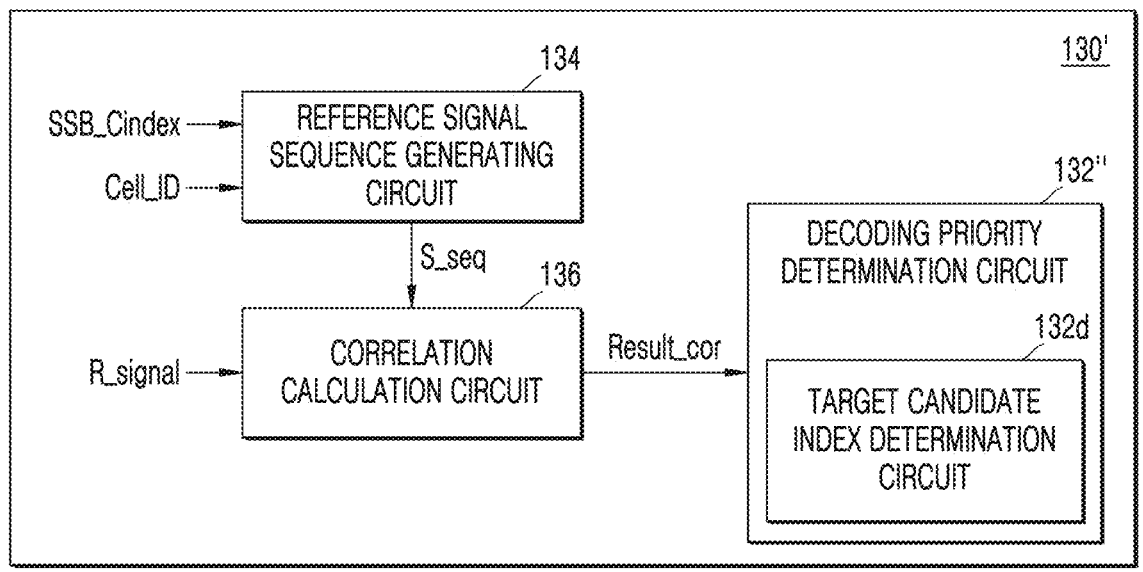
FIG. 10 is a block diagram illustrating a baseband processing circuit including a target candidate index determination circuit, according to an embodiment.

FIG. 10 is a block diagram illustrating a baseband processing circuit 130' according to an embodiment.

Referring to FIG. 10, the baseband processing circuit 130' may include a decoding priority determination circuit 132", the reference signal sequence generating circuit 134, and/or the correlation calculation circuit 136. The decoding priority determination circuit 132" may include a target candidate index determination circuit 132*d*. Hereinafter, an operation of the target candidate index determination circuit 132*d* will be mainly described. According to some example embodiments, operations described herein as being performed by the baseband processing circuit 130', the decoding priority determination circuit 132" and/or the target candidate index determination circuit 132*d* may be performed by processing circuitry.

The target candidate index determination circuit 132*d* according to an example embodiment may determine a target candidate index used for PBCH decoding among candidate indexes of an SSB on the basis of calculation results Result_cor generated by the correlation calculation circuit 136. That is, since the target candidate index determination circuit 132*d* determines the target candidate index, the terminal may perform the PBCH decoding by using target candidate index(es) remaining after filtering out candidate index(es) unsuitable for a desired condition among the candidate indexes of the SSB, instead of performing the PBCH decoding by using all of the candidate indexes of the SSB.

The target candidate index determination circuit 132*d* may compare the calculation results Result_cor (e.g., each correlation degree or value) with a reference value to determine a candidate index (e.g., one or more candidate indexes), corresponding to a calculation result exceeding the reference value, as a target candidate index(es). The reference value may be a value which is previously set in the target candidate index determination circuit 132*d*, or may be a value which is generated by the target candidate index determination circuit 132*d* by using the calculation results Result_cor. For example, the target candidate index determination circuit 132*d* may perform an average operation on the calculation results Result_cor to generate the reference value, or may generate the reference value by using a weighted average operation based on a communication environment between a cell and a terminal. In addition, the target candidate index determination circuit 132*d* may generate the reference value by using various schemes. The decoding priority determination circuit 132" may determine decoding priorities of the target candidate indexes by using the calculation results Result_cor. As described above, candidate index(es) on which PBCH decoding is expected to fail may be previously removed in a process of determining decoding priorities, and thus, cell search may be more quickly performed.

Figure 11:
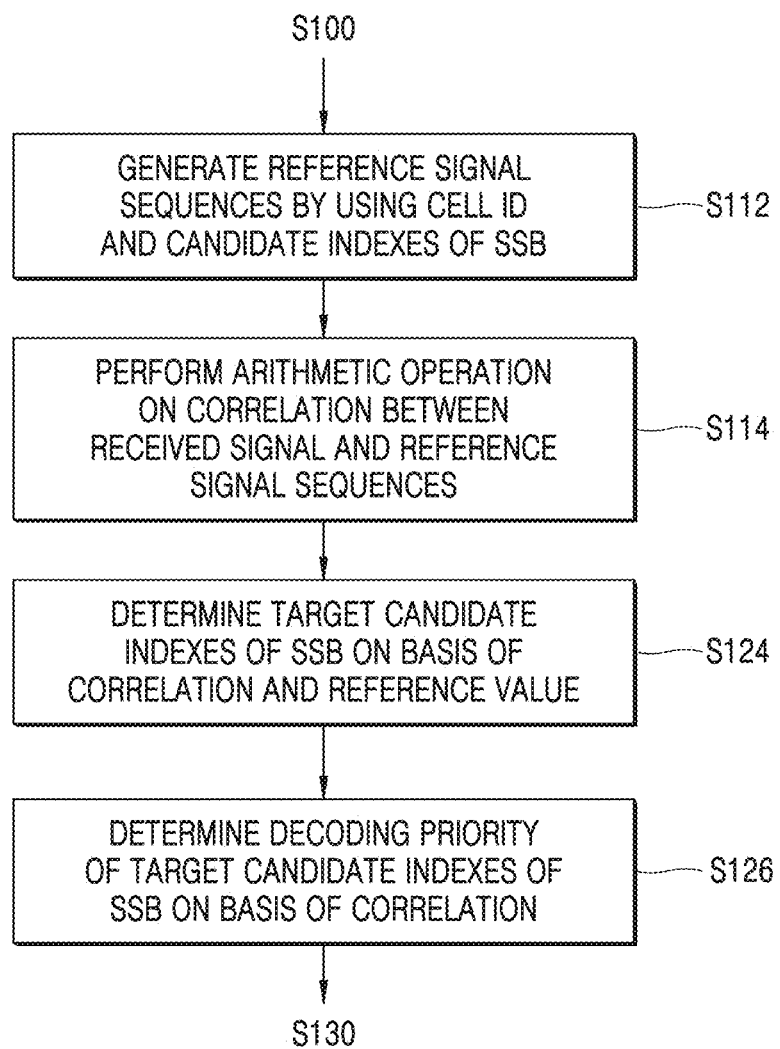
FIG. 11 is a flowchart of an operating method of a terminal including the baseband processing circuit of FIG. 10, according to an example embodiment.

FIG. 11 is a flowchart of an operating method of a terminal in operation S110 and operation S120 of FIG. 4 in detail, according to an example embodiment.

Referring to FIG. 4, after operation S100 of FIG. 4, a terminal may generate reference signal sequences by using a cell ID and candidate indexes of an SSB in operation S112. In operation S114, the terminal may calculate correlation degrees between a received signal and the reference signal sequences (e.g., by performing an arithmetic operation). In operation S124, the terminal may determine target candidate indexes of the SSB on the basis of the correlation degrees and a reference value. In operation S126, the terminal may determine decoding priorities of the target candidate indexes of the SSB on the basis of the correlation degrees. Subsequently, the terminal may proceed to operation S130 of FIG. 4. According to some example embodiments, operations 112 and 114 may be performed as part of operation S110 of FIG. 4, and may be the same as or similar to operations 112 and 114 of FIG. 5. Operations 124 and 126 may be performed as part of operation 120 of FIG. 4 and/or operation 122 of FIG. 5.

Figure 12:
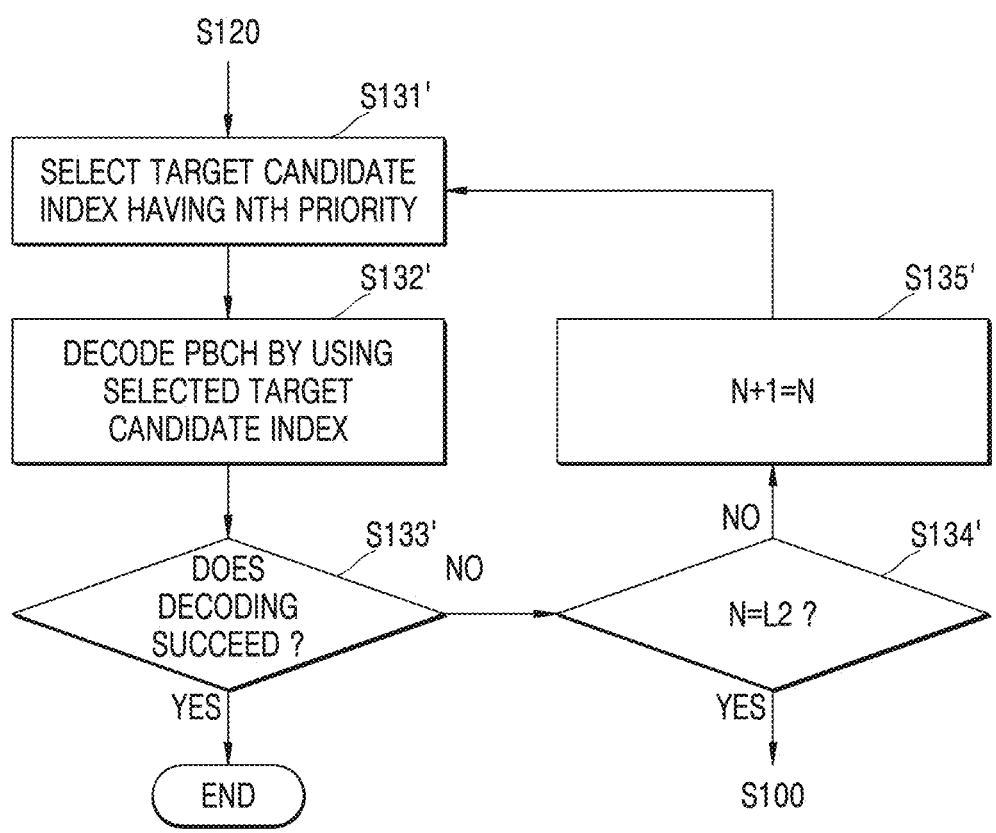
FIG. 12 is a flowchart of an operating method of a terminal in operation S130 of FIG. 11 in detail, according to an example embodiment.

FIG. 12 is a flowchart of an operating method of a terminal in operation S130 of FIG. 11 in detail, according to an example embodiment.

Referring to FIG. 12, in operation S131', a terminal may select a target candidate index having an $N^{th}$ priority (e.g., the highest priority) with reference to decoding priorities of target candidate indexes of a received SSB. In operation S132', the terminal may decode a PBCH by using the selected target candidate index. In detail, the terminal may estimate a channel between a cell and the terminal by using a reference signal sequence corresponding to the selected target candidate index and a reference signal of the received SSB and may perform decoding on the PBCH by using a channel estimation result. In operation S133', the terminal may determine the decoding succeeds or fails on the basis of a certain scheme (for example, a CRC check scheme). When the decoding succeeds (S133', Yes), the terminal may report the selected target candidate index to the cell and may end (e.g., successfully complete) a cell search operation. Otherwise, when the decoding fails (S133', No), the terminal may determine whether 'N' corresponds to 'L2' representing the number of target candidate indexes of the SSB in operation S134'. When 'N' does not correspond to 'L2' (S134', No) (e.g., when N is not the last target candidate index in priority order), the terminal may increment 'N' in operation S135' and may proceed to operation S131'. That is, the terminal may select a target candidate index having an $N+1^{th}$ priority (e.g., the next highest priority) and may perform subsequent operations. Otherwise, when 'N' corresponds to 'L2' (S134', Yes), the terminal may check (e.g., determine) that a PBCH decoding operation based on a decoding priority fails and may receive a new SSB from the cell to proceed to operation S100 of FIG. 4, or may proceed to operation S100 of FIG. 4 by using another previously received SSB.

Figure 13:
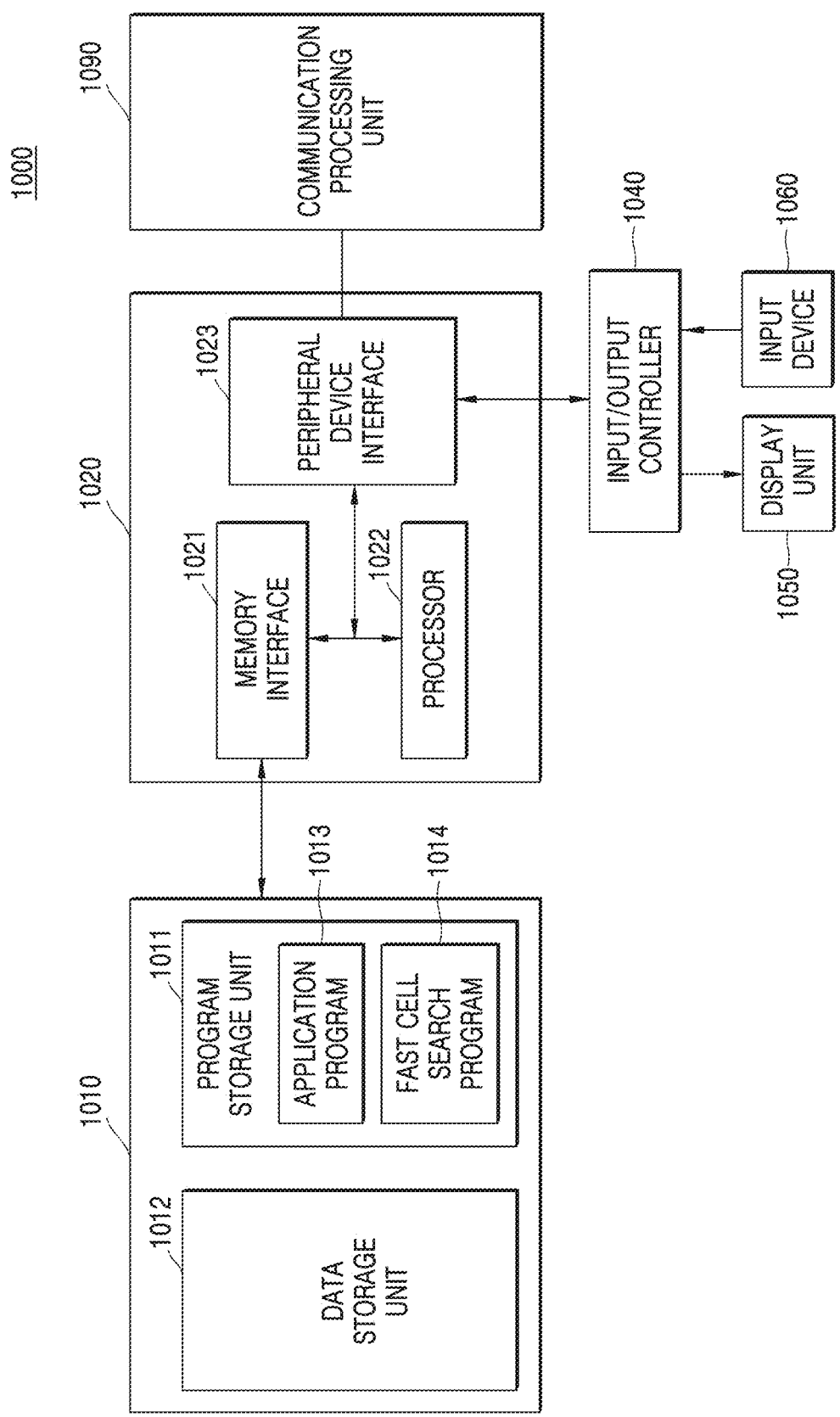
FIG. 13 is a block diagram illustrating an electronic device according to an example embodiment.

FIG. 13 is a block diagram illustrating an electronic device 1000 according to an example embodiment.

Referring to FIG. 13, the electronic device 1000 may include a memory 1010, a processor unit 1020, an input/output (I/O) controller 1040, a display unit 1050, an input device 1060, and/or a communication processing unit 1090. Here, the memory 1010 may be provided in plurality. The elements will be described below.

The memory 1010 may include a program storage unit 1011 which may store a program for controlling an operation of the electronic device 1000 and a data storage unit 1012 which may store data generated in executing the program. According to some example embodiments, the program storage unit 1011 and the data storage unit 1012 may be partitions and/or portions of the memory 1010 configured to store to store data. The data storage unit 1012 may store data used for an operation of an application program 1013 and/or an operation of a fast cell search program 1014. The program storage unit 1011 may include (e.g., store) the application program 1013 and/or the fast cell search program 1014. Here, the programs stored in the program storage unit 1011 may include a set of instructions and may be referred to as an instruction set.

The application program 1013 may include an application program executed in the electronic device 1000. That is, the application program 1013 may include an instruction of an application driven (e.g., executed) by processing circuitry (e.g., by a processor 1022). The fast cell search program 1014 may control an operation of determining a transceiving beam pattern pair according to embodiments. That is, by using the fast cell search program 1014, the electronic device 1000 may determine decoding priorities of candidate indexes of an SSB on the basis of a correlation degree between a received signal and an internal signal of the electronic device 1000 and may perform PBCH decoding on the basis of the determined decoding priorities.

A peripheral device interface 1023 may control a connection between an I/O peripheral device of a base station, the processor 1022, and/or a memory interface 1021. The processor 1022 may perform control (e.g., to control operations of the electronic device 1000) in order for the base station to provide a corresponding service by using at least one software program. In this case, the processor 1022 may execute at least one program stored in the memory 1010 to provide a service corresponding to a corresponding program.

The I/O controller 1040 may provide an interface between the peripheral device interface 1023 and I/O devices such as the display unit 1050 and the input device 1060. The display unit 1050 may display state information, an input letter, a moving picture, a still picture, and/or the like. For example, the display unit 1050 may display application program information driven by the processor 1022.

The input device 1060 may provide input data, generated by a selection and input by the electronic device 1000, to the processor unit 1020 through the I/O controller 1040. In this case, the input device 1060 may include a keypad including at least one hardware button and/or a touch pad for sensing touch information. For example, the input device 1060 may provide, through the I/O controller 1040, the processor 1022 with touch information such as a touch, a touch motion, and/or the release of the touch each sensed through the touch pad.

The electronic device 1000 may include a communication processing unit 1090 which may perform a communication function for voice communication and/or data communication, and the fast cell search program 1024 may control the communication processing unit 1090 to generate a reception beam for a cell search, based on a fast cell search operation.

Figure 14:
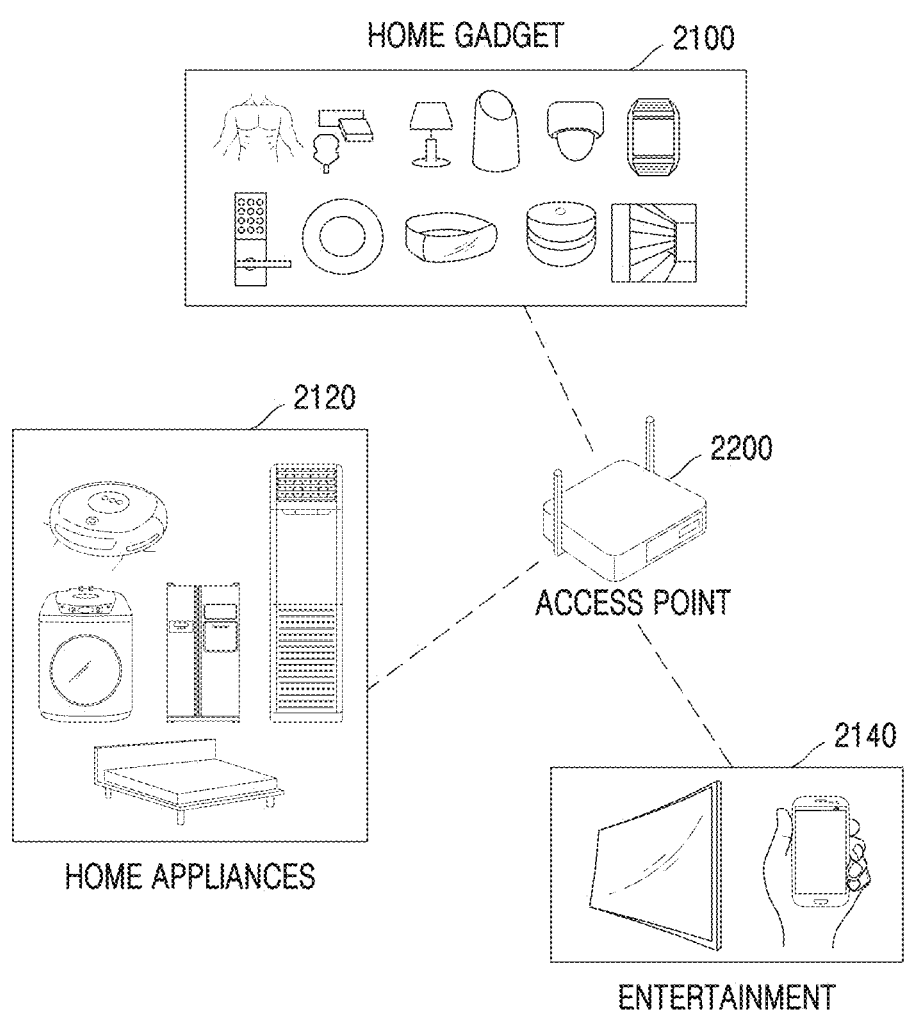
FIG. 14 is a diagram illustrating communication devices for performing a fast cell search operation according to an example embodiment.

FIG. 14 is a diagram illustrating communication devices for performing a fast cell search operation according to an example embodiment.

Referring to FIG. 14, home gadgets 2100, home appliances 2120, entertainment devices 2140, and/or an access point (AP) 2200 may each perform a fast cell search operation according to embodiments. In some embodiments, the home gadgets 2100, the home appliances 2120, the entertainment devices 2140, and/or the AP 2200 may configure an IoT network system. The communication devices illustrated in FIG. 13 are merely an example embodiment, and it may be understood that the terminal 100 according to an example embodiment may be included in other communication devices which are not illustrated in FIG. 13.

The various operations of methods described above may be performed by any suitable device capable of performing the operations, such as processing circuitry. For example, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

When performing a cell search, conventional devices determine an index of a received SSB by randomly, or sequentially, attempting to decode the PBCH of the SSB using each of the candidate indexes for the SSB. Accordingly, the conventional devices may iteratively attempt decoding using all of the candidate indexes for the SSB before successfully decoding the PBCH, resulting in excessive decoding operations and resource consumption (e.g., processor, power, etc.). Further, the excessive decoding operations increase the delay in completing the cell search operation, thereby reducing communication performance of the conventional devices.

However, some example embodiments provide an improved terminal capable of determining which candidate indexes are most likely to be the correct candidate index. Accordingly, the improved terminal is able to determine decoding priorities based on which candidate indexes are most likely to be the correct candidate index. By iteratively decoding the PBCH according to the determined decoding priorities, the improved terminal reduces the number of decoding operations performed, thereby reducing resource consumption and delay in completing the cell search operation. Such reduction in delay is particularly important in ensuring or improving the stability of communication in a 5G communication environment that quickly changes.

While the inventive concepts have been particularly shown and described with reference to embodiments thereof, it will be understood that various changes in form and details may be made therein without departing from the spirit and scope of the following claims.

What is claimed is:

1. An operating method of a terminal in a wireless communication system including a cell and the terminal, the operating method comprising:
    receiving an external signal including a synchronization signal block (SSB) from the cell, the SSB including a primary synchronization signal (PSS), a secondary synchronization signal (SSS), and a physical broadcast channel (PBCH);
    selecting a plurality of target candidate indexes among a plurality of candidate indexes of the SSB based on the PSS and the SSS; and
    performing decoding on the PBCH based on the plurality of target candidate indexes.

2. The operating method of claim 1, wherein the selecting selects first candidate indexes having first correlation values greater than a reference value among the plurality of candidate indexes as the plurality of target candidate indexes, the first correlation values being based on correlations between a reference signal and a plurality of first reference signal sequences corresponding to the first candidate indexes, and the reference signal being included in the SSB.

3. The operating method of claim 2, wherein the reference value is variable based on a communication environment between the cell and the terminal.

4. The operating method of claim 2, wherein the reference value is based on an average of a plurality of second correlation values between a plurality of second reference signal sequences corresponding to the plurality of candidate indexes and the reference signal.

5. The operating method of claim 2, further comprising:
    determining a plurality of decoding priorities of the plurality of target candidate indexes based on the first correlation values,
    wherein the performing decoding performs decoding on the PBCH according to the plurality of decoding priorities.

6. The operating method of claim 5, wherein the plurality of decoding priorities indicate priority in descending order of the first correlation values.

7. The operating method of claim 2, the first reference signal sequences are acquired by using a cell identification obtained from the PSS and the SSS.

8. The operating method of claim 1, wherein the performing decoding comprises:
    selecting a first target candidate index among the plurality of target candidate indexes;
    estimating a channel between the cell and the terminal using a first reference signal sequence corresponding to the first target candidate index to obtain a first channel estimation result; and
    performing a first decoding operation on the PBCH using the first channel estimation result.

9. The operating method of claim 1, further comprising:
    reporting a first target candidate index among the plurality of target candidate indexes used in the performing decoding to the cell based on the performing decoding being successful.

10. The operating method of claim 1, wherein the SSB is received by the terminal through one of a plurality of transmission beams from the cell.

11. A terminal for performing communication with a cell, the terminal comprising:
    a plurality of antennas configured to form a plurality of reception beams for receiving an external signal from the cell through one selected transmission beam selected from among a plurality of transmission beams, the external signal having a synchronization signal block (SSB) including a primary synchronization signal (PSS), a secondary synchronization signal (SSS) and a physical broadcast channel (PBCH); and
    processing circuitry configured to,
        select a plurality of target candidate indexes among a plurality of candidate indexes of the SSB based on the PSS and the SSS, and
        perform decoding on the PBCH based on the plurality of target candidate indexes.

12. The terminal of claim 11, wherein the processing circuitry is configured to select first candidate indexes having first correlation values greater than a reference value among the plurality of candidate indexes as the plurality of target candidate indexes, the first correlation values being based on correlations between a reference signal and a plurality of first reference signal sequences corresponding to the plurality of target candidate indexes, and the reference signal being included in the SSB.

13. The terminal of claim 12, wherein the reference value is variable based on a communication environment between the cell and the terminal.

14. The terminal of claim 12, wherein the reference value is based on an average of a plurality of second correlation values between a plurality of second reference signal sequences corresponding to the plurality of candidate indexes and the reference signal.

15. The terminal of claim 12, wherein the processing circuitry is configured to:
   determine a plurality of decoding priorities of the plurality of target candidate indexes based on the first correlation values; and
   perform decoding on the PBCH based on the plurality of decoding priorities.

16. The terminal of claim 11, wherein the processing circuitry is configured to:
   report a first target candidate index among the plurality of target candidate indexes used in the performing decoding to the cell based on the performing decoding being successful.

17. The terminal of claim 11, wherein the processing circuitry is configured to:
   select a first target candidate index among the plurality of target candidate indexes;
   estimate a channel between the cell and the terminal using a first reference signal sequence corresponding to the first target candidate index to obtain a first channel estimation result; and
   perform a first decoding operation on the PBCH using the first channel estimation result.

18. The terminal of claim 11, the SSB is received by the terminal through one of a plurality of transmission beams from the cell.

19. An operating method of a terminal in a wireless communication system including a cell and the terminal, the operating method comprising:
   receiving an external signal from the cell, the external signal having a synchronization signal block (SSB) including a physical broadcast channel (PBCH) and a reference signal;
   generating a plurality of correlation values between a plurality of reference signal sequences corresponding to a plurality of candidate indexes of the SSB and the reference signal, the plurality of reference signal sequences corresponding to the plurality of candidate indexes of the SSB;
   selecting a plurality of target candidate indexes among the plurality of candidate indexes based on the plurality of correlation values; and
   performing decoding on the PBCH based on the plurality of target candidate indexes.

20. The operating method of claim 19, wherein the performing decoding comprises:
   determining a descending order of first correlations values among the plurality of correlation values of the plurality of target candidate indexes;
   selecting a first target candidate index among the plurality of target candidate indexes based on the descending order; and
   performing decoding on the PBCH using the first target candidate index.

* * * * *

UNITED STATES PATENT AND TRADEMARK OFFICE
CERTIFICATE OF CORRECTION

| | |
|---|---|
| PATENT NO. | : 11,627,543 B2 |
| APPLICATION NO. | : 17/466432 |
| DATED | : April 11, 2023 |
| INVENTOR(S) | : Dahae Chong et al. |

It is certified that error appears in the above-identified patent and that said Letters Patent is hereby corrected as shown below:

On the Title Page

In the Assignee (item (73)), the Assignee listed as "SAMSUNG ELECTRONICS CO, LTD." should be listed as --SAMSUNG ELECTRONICS CO., LTD.--

Signed and Sealed this
Twenty-fifth Day of July, 2023

Katherine Kelly Vidal
*Director of the United States Patent and Trademark Office*